United States Patent
Daian et al.

(10) Patent No.: US 8,107,746 B2
(45) Date of Patent: Jan. 31, 2012

(54) IMAGE PROCESSOR

(75) Inventors: Hideki Daian, Osaka (JP); Yujiro Tani, Osaka (JP); Yusuke Mizuno, Osaka (JP); Nobuhiro Minami, Osaka (JP); Masahiro Moriyama, Osaka (JP); Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 470 days.

(21) Appl. No.: 12/405,527

(22) Filed: Mar. 17, 2009

(65) Prior Publication Data

US 2010/0086223 A1    Apr. 8, 2010

(30) Foreign Application Priority Data

Oct. 8, 2008    (JP) .................................. 2008-261198

(51) Int. Cl.
*G06K 9/36* (2006.01)
(52) U.S. Cl. ......................... 382/233; 382/263; 382/264
(58) Field of Classification Search .................. 382/233, 382/263, 264; 348/461, E5.006; 345/503; 341/67, 82; 375/240.23, E7.093; 365/103, 365/230.03
See application file for complete search history.

(56) References Cited

U.S. PATENT DOCUMENTS

| | | | | |
|---|---|---|---|---|
| 5,778,096 A | * | 7/1998 | Stearns | 382/233 |
| 5,818,967 A | * | 10/1998 | Bhattacharjee et al. | 382/233 |
| 5,852,469 A | * | 12/1998 | Nagai et al. | 375/240.23 |

FOREIGN PATENT DOCUMENTS

| | | | |
|---|---|---|---|
| JP | 60101798 A | * | 6/1985 |
| JP | 01258049 A | * | 10/1989 |

OTHER PUBLICATIONS

"HD Photo—Photographic Still Image File Format", Device Porting Kit Specification, Version 1.0, Nov. 7, 2006, pp. 140.
"Coding of Still Pictures—JBIG JPEG", ISO/IEC JTC 1/SC 29/WG1 N 4392, ISO/IEC CD 29199-2:200x (E), Dec. 19, 2007, pp. 151.
"Coding of Still Pictures—JBIG JPEG", ISO/IEC JTC 1/SC 29/WG1 N 4739, ISO/IEC FCD 29199-2:200x (E), Sep. 14, 2008, pp. 171.

* cited by examiner

*Primary Examiner* — Anh Hong Do
(74) *Attorney, Agent, or Firm* — Oblon, Spivak, McClelland, Maier & Neustadt, L.L.P.

(57) ABSTRACT

A decoding unit includes a first processing unit including ND decoding units and decoding a group of Normal Data, a second processing unit decoding a group of Flex Bits, and a selector. The ND decoding units perform decoding of the group of Normal Data, stepwise varying a start position of decoding in the data stream, concurrently with decoding of the group of Flex Bits by the second processing unit. The selector selects one ND decoding unit with a start position of decoding being set at a position immediately following an end position of the group of Flex Bits, from the ND decoding units, based on a result of decoding of the group of Flex Bits.

10 Claims, 10 Drawing Sheets

PRIOR ART

FIG. 11

PRIOR ART

IMAGE PROCESSOR

CROSS-REFERENCE TO RELATED APPLICATIONS

This application claims priority to Japanese Patent Application No. 2008-261198. The entire disclosure of Japanese Patent Application No. 2008-261198 is hereby incorporated herein by reference.

BACKGROUND OF THE INVENTION

1. Field of the Invention

The present invention relates to an image processor, and more particularly, to a decoder for HD Photo.

2. Description of the Background Art

Microsoft Corporation has recently proposed HD Photo (or JPEG XR) as a still image file format that offers higher image quality than JPEG while requiring more simple circuit configuration and computation than JPEG 2000.

An encoder for HD Photo includes a color conversion unit, a pre-filter, a frequency transform unit, a quantization unit, a prediction unit and an encoding unit.

The frequency transform unit performs predetermined frequency transform (PCT) on an inputted pixel signal, so as to output frequency data (coefficient data) of highpass, lowpass, and direct current components. One macroblock having 16 pixels in column×16 pixels in row includes 240 sets of frequency data of highpass component, 15 sets of frequency data of lowpass component, and 1 set of frequency data of direct current component for each of luminance Y, chrominance U, and chrominance V.

The quantization unit discards lower (or less significant) data equivalent to the number of digits defined by a quantization coefficient in frequency data of each component inputted from the frequency transform unit, so as to output frequency data after quantization (highpass, lowpass, and direct current component).

The encoding unit splits the frequency data of each component inputted from the prediction unit into upper (or more significant) data (Normal Data) in an upper digit range and lower data (Flex Bits) in a lower digit range. Then the encoding unit performs entropy coding on the Normal Data of each component, and output the same, while outputting the Flex Bits of each component without entropy coding.

A decoder for HD Photo includes a color inverse conversion unit, a post-filter, a frequency inverse transform unit, a dequantization unit, an inverse prediction unit and a decoding unit. The decoder performs processing in reverse order to processing by the encoder, so as to decompress pixel signals from the coded frequency data.

The details of HD Photo are disclosed in, for example, "HD Photo—Photographic Still Image File Format", [online], 7 Nov. 2006, Microsoft Corporation, [searched in the Internet on 10 Oct. 2007], <URL: http://www.microsoft.com/whdc/xps/hdphotodpk.mspx>. The details of JPEG XR are disclosed in, for example, "Coding of Still Pictures—JBIG JPEG", [online], 19 Dec. 2007, ISO/IEC JTC 1/SC 29/WG1 N 4392, [searched in the Internet on 4 Mar. 2008], <URL: http://www.itscj.ipsj.orjp/sc29/open/29view/29n9026t.doc> or "Coding of Still Pictures—JBIG JPEG", [online], 14 Sep. 2008, ISO/IEC JTC 1/SC 29/WG1 N 4739, [searched in the Internet on 17 Sep. 2008], <URL:http://www.itscj.ipsj.orjp/sc29/open/29view/29n9749t.doc>.

Figure 10:
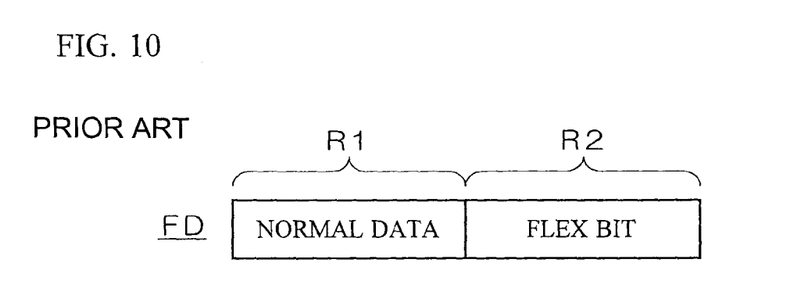
FIG. 10 shows a set of frequency data in HD Photo.

FIG. 10 shows a set of frequency data FD in HD Photo. The frequency data FD is split into Normal Data (hereinafter referred to as "ND" for short) in an upper digit range R1 and Flex Bits (herein after referred to as "FB" for short) in a lower digit range R2 by an encoding unit of the encoder. One can set the border between the digit ranges R1 and R2 (i.e., the data length of the Flex Bits) arbitrarily by a predetermined parameter (Model Bit).

Figure 11:
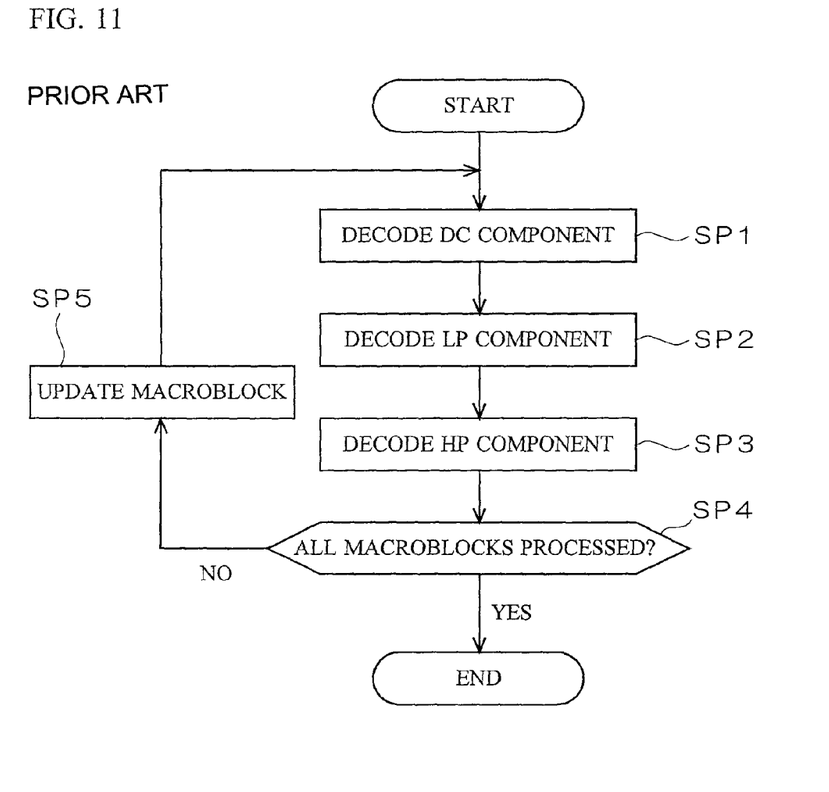
FIG. 11 is a flowchart schematically showing the stream of processing in a decoding unit of a decoder for HD Photo.

FIG. 11 is a flowchart schematically showing the stream of processing in a decoding unit of the decoder for HD Photo. First in a step SP1, decoding of the frequency data of a direct current component (DC component) is performed. When the values of Normal Data of direct current component in a target macroblock are all zero, however, processing in the step SP1 of the macroblock is not performed but skipped.

Next in a step SP2, decoding of the frequency data of a lowpass component (LP component) is performed. Similar to the above, when the values of Normal Data of lowpass components in the target macroblock are all zero, processing in the step SP2 of the macroblock is not performed but skipped.

Next in a step SP3, decoding of the frequency data of highpass component (HP component) is performed. Similar to the above, when the values of Normal Data of highpass component in the target macroblock are all zero, processing in the step SP3 of the macroblock is not performed but skipped.

Next in a step SP4, it is determined whether or not all macroblocks (MB) have been decoded. If there is any macroblock that has not been decoded (i.e., if the result of determination in the step SP4 is "NO"), the target of decoding is updated to a next macroblock in a step SP5, and then the processing in the step SP1 and the following steps is repeated. In contrast, if all macroblocks have been decoded, (i.e., if the result of determination in the step SP4 is "YES"), processing is terminated.

Figure 12:
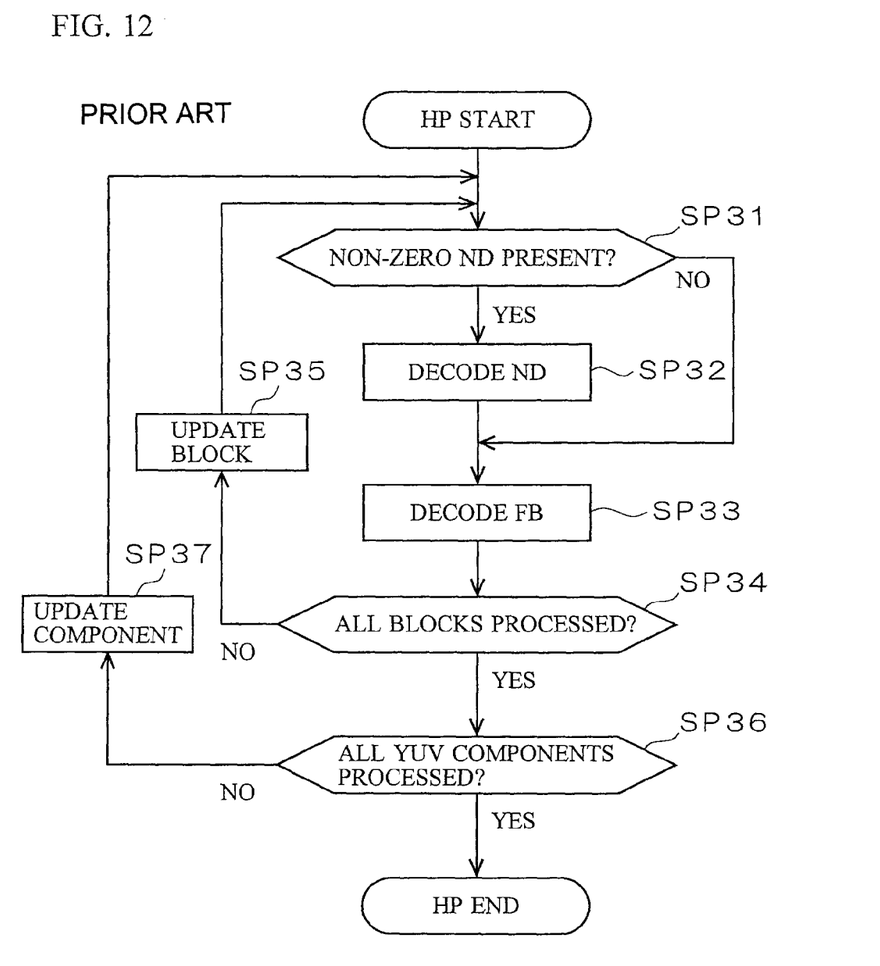
FIG. 12 is a flowchart showing the details of decoding of highpass component in FIG. 11.

FIG. 12 is a flowchart showing the details of decoding of highpass component (step SP3) in FIG. 11. First in a step SP31, it is determined whether or not a target block includes at least one set of Normal Data having a value that is not zero.

If a set of Normal Data having a value that is not zero is included (i.e., if the result of determination in the step SP31 is "YES"), decoding is performed on 15 sets of Normal Data included in the block in the next step SP32. In contrast, if the values of Normal Data included in the block are all zero (i.e., if the result of determination in the step SP31 is "NO"), processing in the step SP32 of the block is not performed but skipped.

Next in a step SP33, decoding is performed on 15 sets of Flex Bits included in the block.

Next in a step SP34, it is determined whether or not all blocks have been decoded. If there is any block which has not been decoded (i.e., if the result of determination in the step SP34 is "NO"), the target of decoding is updated to a next block in a step SP35, and then processing in the step SP31 and the following steps is repeated.

In contrast, if all blocks have been decoded, (i.e., if the result of determination in the step SP34 is "YES"), it is determined in a next step SP36 whether all of the Y, U, and V components have been decoded. If there is any component which has not been decoded (i.e., if the result of determination in the step SP36 is "NO"), the target of decoding is updated to a next component in a step SP37, and then processing in the step SP31 and the following steps is repeated. In contrast, if all components have been decoded, (i.e., if the result of determination in the step SP36 is "YES"), processing is terminated.

Figure 13:
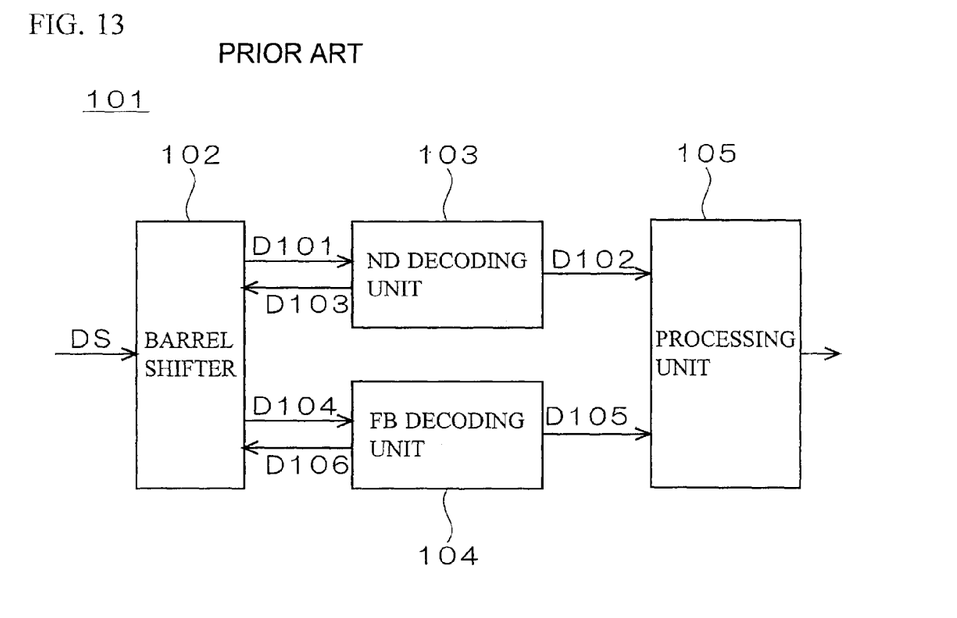
FIG. 13 is a block diagram showing a configuration of a decoding unit of a decoder for HD Photo.

FIG. 13 is a block diagram showing a configuration of a decoding unit 101 of a decoder for HD Photo. The decoding unit 101 includes a barrel shifter 102, an ND decoding unit 103 decoding Normal Data, an FB decoding unit 104 decoding a Flex Bit, and a processing unit 105.

As described above, one macroblock includes 240 sets of frequency data of highpass component, 15 sets of frequency data of lowpass component, and 1 set of frequency data of direct current component. The decoding unit 101 performs decoding on a block including 15 sets of frequency data as a unit region for processing for highpass and lowpass components. Thus the decoding unit 101 processes 16 blocks of highpass component and 1 block of lowpass component for one macroblock.

Decoding of frequency data of highpass component is illustrated below. Referring to FIG. 13, data stream DS of coded frequency data is inputted to the barrel shifter 102.

Figure 14:
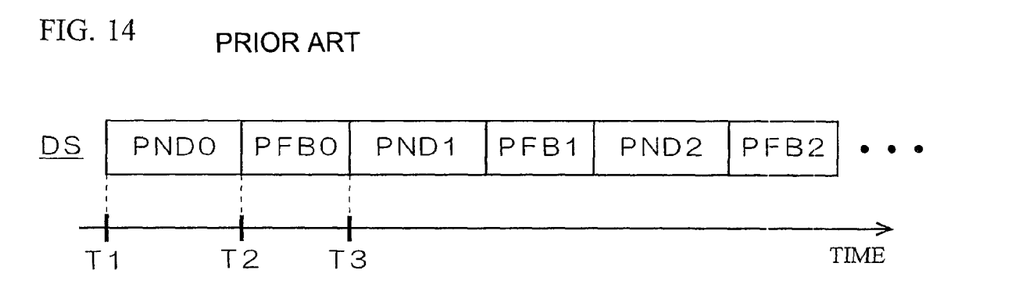
FIG. 14 shows a part of data stream.

FIG. 14 shows a part of the data stream DS. In the data stream DS, a group of Normal Data PND0 including 15 sets of Normal Data of a 0th block, a group of Flex Bits PFB0 including 15 sets of Flex Bits of the 0th block, a group of Normal Data PND1 including 15 sets of Normal Data of a 1st block, a group of Flex Bits PFB1 including 15 sets of Flex Bits of the 1st block, . . . , are aligned in this order.

Referring to FIGS. 13 and 14, the barrel shifter 102 first inputs the group of Normal Data PND0 (data D101 in FIG. 13) to the ND decoding unit 103 at time T1. Then the ND decoding unit 103 performs entropy decoding on the group of Normal Data PND0, so as to output decoded data D102 of the group of Normal Data PND0. The decoded data D102 of the group of Normal Data PND0 is inputted to the processing unit 105. When decoding of the group of Normal Data PND0 is completed, the ND decoding unit 103 provides notification regarding the end position of the group of Normal Data PND0 in the data stream DS as data D103 to the barrel shifter 102.

Next the barrel shifter 102 inputs the group of Flex Bits PFB0 (data D104 in FIG. 13) to the FB decoding unit 104 at time T2. Then the barrel shifter 102 refers to the data D103 inputted from the ND decoding unit 103, and sets the position immediately following the end position of the group of Normal Data PND0 in the data stream DS as the leading position of the group of Flex Bits PFB0. The FB decoding unit 104 decodes the group of Flex Bits PFB0, so as to output decoded data D105 of the group of Flex Bits PFB0. The decoded data D105 of the group of Flex Bits PFB0 is inputted to the processing unit 105. When decoding of the group of Flex Bits PFB0 is completed, the FB decoding unit 104 provides notification regarding the end position of the group of Flex Bits PFB0 in the data stream DS as data D106 to the barrel shifter 102.

Next, the barrel shifter 102 inputs the group of Normal Data PND1 (data D101 in FIG. 13) to the ND decoding unit 103 at time T3. Then the barrel shifter 102 refers to the data D106 inputted from the FB decoding unit 104, and sets the position immediately following the end position of the group of Flex Bits PFB0 in the data stream DS as the leading position of the group of Normal Data PND1. The ND decoding unit 103 performs entropy decoding on the group of Normal Data PND1, so as to output decoded data D102 of the group of Normal Data PND1. The decoded data D102 of the group of Normal Data PND1 is inputted to the processing unit 105. When decoding of the group of Normal Data PND1 is completed, the ND decoding unit 103 provides notification regarding the end position of the group of Normal Data PND1 in the data stream DS as data D103 to the barrel shifter 102.

From then on, a group of Flex Bit PFB1, a group of Normal Data PND2, a group of Flex Bit PFB2, . . . , are decoded in order in the same manner as the above. The processing unit 105 performs processing such as sorting and joining of data on the plural sets of decoded data D102 inputted from the ND decoding unit 103 and the plural sets of decoded data D105 inputted from the FB decoding unit 104, and sends out the decoded data after processing to a subsequent processing circuit (inverse prediction unit).

According to an example in FIGS. 13 and 14, decoding of a group of Normal data and decoding of a group of Flex Bits are performed serially. Thus even when decoding of a certain group of Normal Data is completed, start of decoding of a next group of Normal Data needs to be queued until decoding of the group of Flex Bits corresponding to the former group of Normal Data is completed. This queue time in decoding is the bottleneck of a decoder for HD Photo.

SUMMARY OF THE INVENTION

It is an object of the present invention to provide an image processor that achieves enhanced speed of decoding, by reducing queue time.

According to a first aspect of the present invention, an image processor decodes plural sets of data included in plural blocks. Each of the blocks includes plural sets of data, and each set of the data includes upper data in an upper digit range and lower data in a lower digit range. The image processor receives data stream including a group of upper data of a first block, a group of lower data of the first block and a group of upper data of a second block aligned in this order. The image processor includes a first processing unit including a plurality of decoding units and decoding a group of upper data, a second processing unit decoding a group of lower data, and a selecting unit selecting one of the plurality of decoding units. The plurality of decoding units perform decoding of the group of upper data of the second block, stepwise varying a start position of decoding in the data stream, concurrently with decoding of the group of lower data of the first block by the second processing unit, and the selecting unit selects, from the plurality of decoding units, one decoding unit with a start position of decoding being set at a position immediately following an end position of the group of lower data of the first block, based on a result of decoding of the group of lower data of the first block by the second processing unit.

A first processing unit includes a plurality of decoding units. Then the decoding units perform decoding of the group of upper data of the second block, concurrently with decoding of the group of lower data of the first block by the second processing unit. Thus start of decoding of the group of upper data of the second block does not need to be queued until decoding of the group of lower data of the first block is completed. Consequently, reduction of queue time enables enhanced speed of decoding.

Furthermore, the decoding units perform decoding of the group of upper data of the second block, stepwise varying a start position of decoding in the data stream. Then the selecting unit selects, from the decoding units, one decoding unit with a start position of decoding being set at the position immediately following the end position of the group of lower data of the first block. Thus the image processor appropriately deal with variation in the leading position of the group of upper data of the second block in the data stream due to the variable data length of the group of lower data of the first block. Specifically, decoding is performed on plural possible groups of upper data of the second block with the start positions varying stepwise from each other in advance. Then an appropriate one is selected from the plural candidates, when decoding of the group of lower data of the first block is completed and the data length is determined. Consequently, correct decoded data of the group of upper data of the second block is obtained.

Preferably in the image processor, each of the blocks includes N sets of the data, where N represents a natural number not less than 2, and the first processing unit includes N+1 decoding units (the number of the decoding units included in the first processing unit is N+1).

There are N+1 possible data lengths of the group of lower data of the first block, depending on the number of data sets of the lower data to which a sign bit having one bit is added among N sets of the lower data. Thus there are also N+1 possible start positions of decoding of the group of upper data of the second block maximum in the data stream. In the image processor, the first processing unit includes N+1 decoding units. Thus decoding of the group of upper data of the second block is performed with all N+1 possible leading positions. The decoded data on which decoding is performed with the appropriate start position is therefore included in the N+1 sets of decoded data obtained by the N+1 decoding units without fail. If such an appropriate decoded data is not included, decoding on the group of upper data of the second block needs to be performed again after decoding on the group of lower data of the first block is completed. Since appropriate coded data is included without fail, there is no possibility that decoding needs to be performed again, and therefore decoding speed is enhanced.

Preferably the image processor further includes a third processing unit obtaining a candidate leading position of the group of upper data of the second block in the data stream, based on a result of decoding of the group of upper data of the first block. Only as many decoding units as the number of the candidate leading positions among the N+1 decoding units perform decoding of the group of upper data of the second block.

Superfluous drive units are not driven, when candidate leading positions are narrowed down and therefore not all of the drive units need to be driven. Thus power consumption is reduced.

Preferably in the image processor, each of the block includes N sets of data, where N represents a natural number not less than 2, and the first processing unit includes M decoding units, where M represents a natural number not less than 2 and not more than N, and when a decoding unit with a start position of decoding being set at a position immediately following the end position is not included in the M decoding units, any one of the M decoding units performs decoding of the group of upper data of the second block with a position immediately following the end position as a start position.

There are N+1 possible data lengths of the group of lower data of the first block, depending on the number of data sets of the lower data to which a sign bit having one bit is added among N sets of lower data. Thus there are also N+1 possible start positions of decoding of the group of upper data of the second block maximum in the data stream. In the image processor, the first processing unit includes M decoding units which is less than N+1. Thus the circuit size is reduced compared to the case where N+1 decoding units are provided. It is possible that the decoded data on which decoding is performed with the appropriate start position is not included in the M sets of decoded data obtained by the M decoding units. In such a case, however, decoding on the group of upper data of the second block is performed again, after decoding on the group of lower data of the first block is completed and the end position is determined, with a start position being set at the position immediately following the end position. Correct decoded data is thus obtained.

Preferably the image processor further includes a third processing unit obtaining a candidate leading position of the group of upper data of the second block in the data stream, based on a result of decoding of the group of upper data of the first block. When the number of the candidate leading positions is less than M, only as many decoding units as the number of the candidate leading positions among the M decoding units perform decoding of the group of upper data of the second block.

Superfluous drive units are not driven, when candidate leading positions are narrowed down and therefore not all of the drive units need to be driven. Thus power consumption is reduced.

Preferably in the image processor, the data is frequency data of highpass or lowpass component in HD Photo.

In HD Photo, one macroblock of highpass component includes plural (16) blocks for each of YUV components, one block includes plural (15) sets of frequency data, and each set of frequency data includes Normal Data in an upper digit range and Flex Bits in a lower digit range. One macroblock of lowpass component includes one block for each of the YUV components, one block includes plural (15) sets of frequency data, and each set of frequency data includes Normal Data in an upper digit range and Flex Bits in a lower digit range. Thus the present invention is preferably applicable to a decoder for HD Photo. Applying the present invention to a decoder for HD Photo achieves enhanced speed of decoding.

The present invention reduces queue time and thus achieves enhanced speed of decoding.

These and other objects, features, aspects and advantages of the present invention will become more apparent from the following detailed description of the present invention when taken in conjunction with the accompanying drawings.

DESCRIPTION OF THE PREFERRED EMBODIMENTS

Preferred embodiments of the present invention are described in detail below referring to the drawings. It should be noted that identical reference numerals throughout the drawings indicate identical or equivalent elements. An example of applying an image processor according to the present invention to a decoder for HD Photo (specifically decoding of frequency data of highpass component) is described in the following description. The image processor, however, is applicable not only to a decoder for HD Photo, but also to an arbitrary decoder decoding plural sets of data included in plural blocks.

First Preferred Embodiment

Figure 1:
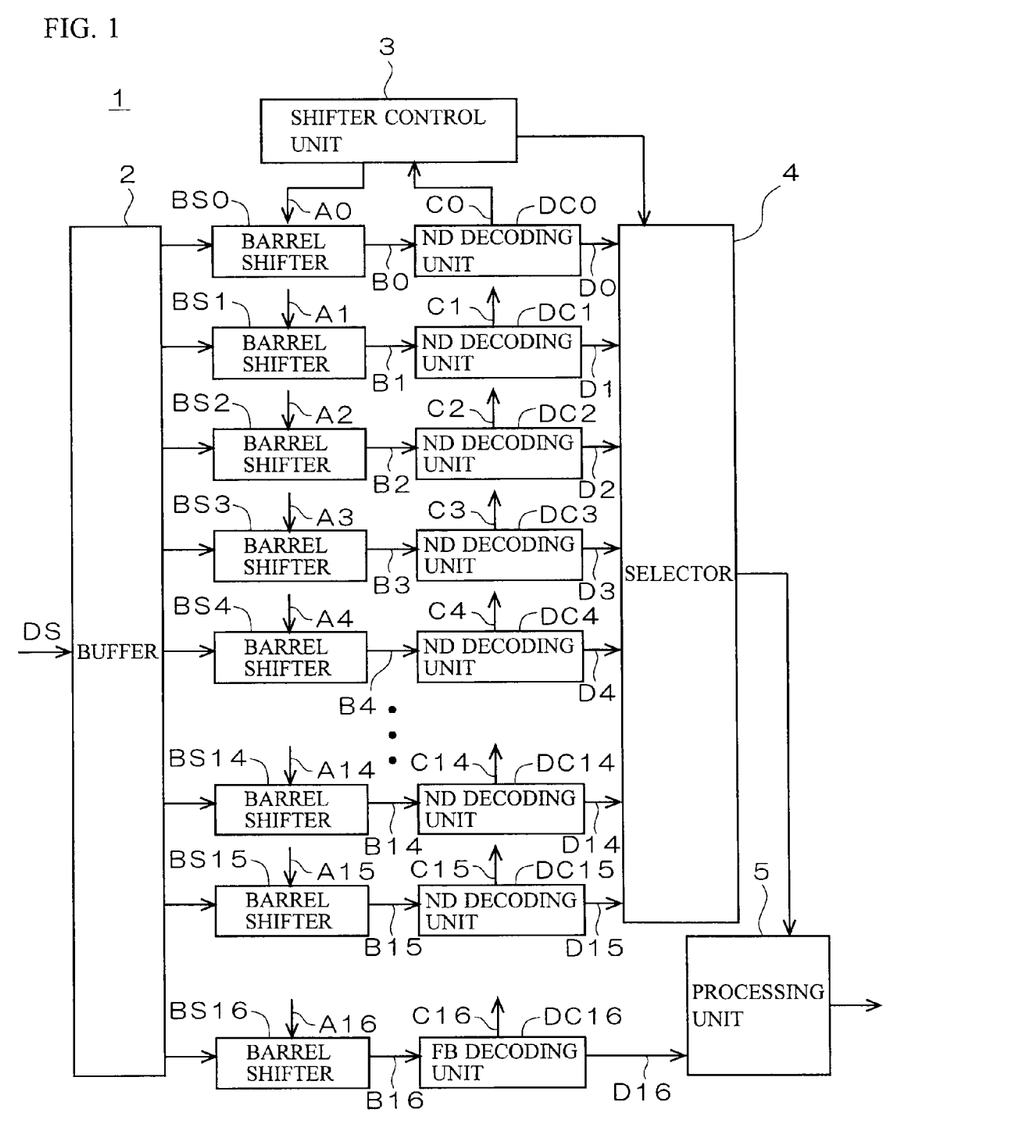
FIG. 1 is a block diagram showing a configuration of an image processor according to a first preferred embodiment of the present invention.

FIG. 1 is a block diagram showing a configuration of an image processor according to a first preferred embodiment of the present invention. FIG. 1 specifically shows a configuration of a decoding unit 1 in a decoder for HD Photo. The decoding unit 1 includes a buffer 2, a first processing unit decoding Normal Data, a second processing unit decoding Flex Bits, a shifter control unit 3, and a processing unit 5. The first processing unit includes 16 barrel shifters BS0 to BS15, 16 ND decoding units DC0 to DC15, and a selector 4. Each input of the ND decoding units DC0 to DC15 is respectively connected to each output of the barrel shifters BS0 to BS15. The input of the selector 4 is connected to each output of the ND decoding units DC0 to DC15. The output of the selector 4 is connected to the input of the processing unit 5. The second processing unit includes a barrel shifter BS16 and an FB decoding unit DC16. The input of the FB decoding unit DC16 is connected to the output of the barrel shifter BS16. The output of the FB decoding unit DC16 is connected to the input of the processing unit 5. Each input of the barrel shifters BS0 to BS16 is connected to the output of the buffer 2. The shifter control unit 3 is connected to the ND decoding units DC0 to DC15, the FB decoding unit DC16, the barrel shifters BS0 to BS16, and the selector 4.

Data stream DS of coded frequency data is inputted to the buffer 2, and the buffer 2 temporarily holds the inputted data stream DS.

Figure 2:
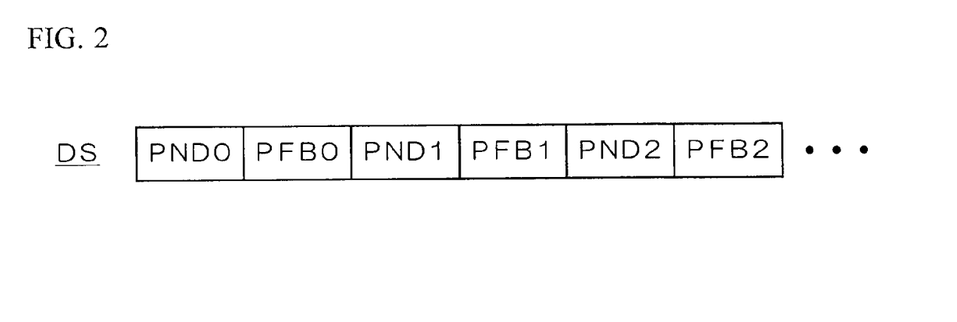
FIG. 2 shows a part of the data stream.

FIG. 2 shows a part of the data stream DS. In the data stream DS, a group of Normal Data PND0 of a 0th block, a group of Flex Bits PFB0 of the 0th block, a group of Normal Data PND1 of a 1st block, a group of Flex Bits PFB1 of the 1st block, . . . , are aligned in this order.

Figure 3:
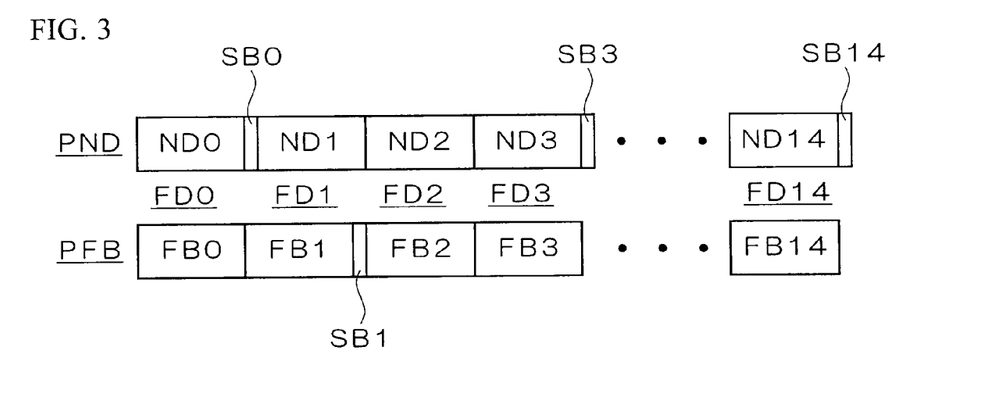
FIG. 3 shows a group of Normal Data and a group of Flex Bits being placed one below the other.

FIG. 3 shows a group of Normal Data PND and a group of Flex Bits PFB being placed one below the other. The group of group of Normal Data PND includes 15 sets of Normal Data (ND0 to ND14), and the group of Flex Bits PFB includes 15 sets of Flex Bits (FB0 to FB14). For example, the Normal Data (ND0) and the Flex Bits (FB0) are respectively equivalent to the upper data and the lower data of frequency data FD0.

In each set of the frequency data FD0 to FD14, if the value of Normal Data is not zero (FD0, FD3, and FD14 in the example of FIG. 3), a sign bit (SB0, SB3, and SB14) having one bit is added to the Normal Data. If the value of Normal Data is zero and the value of Flex Bits is not zero (FD1 in the example of FIG. 3), a sign bit (SB1) having one bit is added to the Flex Bits. When the values of Normal Data and Flex Bits are both zero (FD2 in the example of FIG. 3), no sign bit is added.

As such, depending on the values of Normal Data and Flex Bits, a sign bit is or is not added to Flex Bits. Thus depending on the number of sets of Flex Bits to which a sign bit is added, the data length of a group of Flex Bits PFB is variable. When a sign bit is not added to any of the 15 sets of Flex Bits, the data length of the group of Flex Bits PFB is (Model Bit*15+0) bits, which is the shortest. When a sign bit is added to all of the 15 sets of Flex Bits, the data length of the group of Flex Bits PFB is (Model Bit*15+15) bits, which is the longest. Thus there are 16 (=15+1) possible data lengths of the group of Flex Bits PFB, depending on the number of sets of Flex Bits to which a sign bit having one bit is added among 15 sets of Flex Bits.

Figure 4:
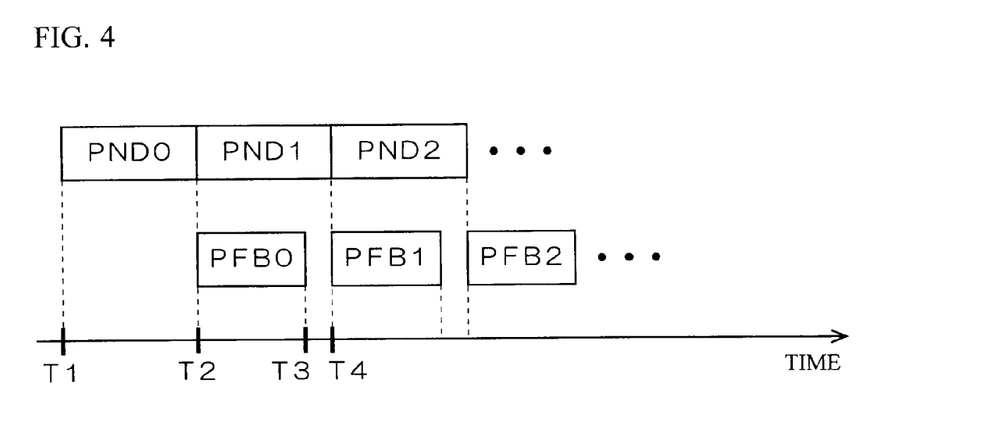
FIG. 4 is a timing diagram showing the order in which plural groups of Normal Data and plural groups of Flex Bits are processed by a decoding unit.
Figure 5:
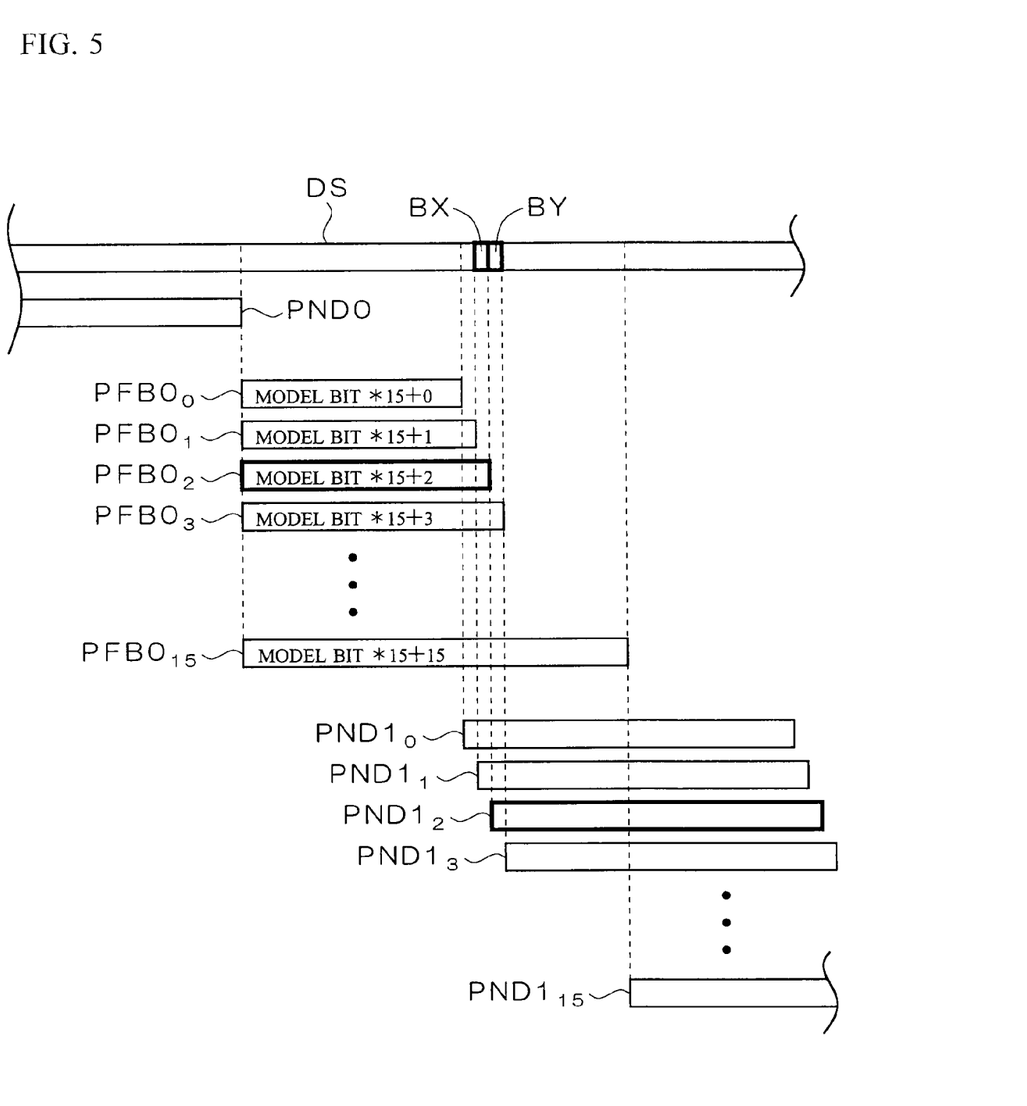
FIG. 5 is a timing diagram showing the details of processing of groups of Normal Data and a group of Flex Bits by the decoding unit.

FIG. 4 is a timing diagram showing the order in which plural groups of Normal Data and plural groups of Flex Bits are processed by the decoding unit 1. FIG. 5 is a timing diagram showing the details of processing of the groups of Normal Data PND0 and PND1 and the group of Flex Bits PFB0 by the decoding unit 1. Operation of the decoding unit 1 is illustrated below referring to FIGS. 1, 4, and 5.

First the barrel shifter BS0 refers to data A0 inputted from the shifter control unit 3 and inputs the group of Normal Data PND0 (data B0 in FIG. 1) to the ND decoding unit DC0 at time T1. The ND decoding unit DC0 performs entropy decoding on the group of Normal Data PND0, so as to output decoded data D0 of the group of Normal Data PND0. The decoded data D0 is inputted to the processing unit 5 via the selector 4. When decoding of the group of Normal Data PND0 is completed, the ND decoding unit DC0 provides notification regarding the end position of the group of Normal Data PND0 in the data stream DS as data C0 to the shifter control unit 3.

Next the barrel shifter BS16 inputs the group of Flex Bits PFB0 (data B16 in FIG. 1) to the FB decoding unit DC16 at time T2. Then the shifter control unit 3 refers to the data C0 inputted from the ND decoding unit DC0, and sets the position immediately following the end position of the group of Normal Data PND0 in the data stream DS as the leading position of the group of Flex Bits PFB0. The shifter control unit 3 then provides notification regarding the leading position of the group of Flex Bits PFB0 as data A16 to the barrel shifter BS16. The FB decoding unit DC16 decodes the group of Flex Bits PFB0, so as to output decoded data D16 of the group of Flex Bits PFB0. The decoded data D16 of the group of Flex Bits PFB0 is inputted to the processing unit 5. When decoding of the group of Flex Bits PFB0 is completed, the FB decoding unit DC16 provides notification regarding the end position of the group of Flex Bits PFB0 in the data stream DS as data C16 to the shifter control unit 3.

Also at time T2, the shifter control unit 3 sets the position lower by (Model Bit*15+0) bits, which is the data length of a first candidate group of Flex Bits $PFB0_0$ (see FIG. 5), than the leading position of the group of Flex Bits PFB0 in the data stream DS as a first candidate leading position of the group of Normal Data PND1. The data on the Model Bit has been provided to the shifter control unit 3 in advance. Then the shifter control unit 3 provides notification regarding the first candidate leading position of the group of Normal Data PND1 as data A0 to the barrel shifter BS0. Similarly, the shifter control unit 3 sets the position lower by (Model Bit*15+1) bits, which is the data length of a second candidate group of Flex Bits $PFB0_1$, than the leading position of the group of Flex Bits PFB0 as a second candidate leading position of the group of Normal Data PND1, and provide notification regarding the position as data A1 to the barrel shifter BS1. Similarly, the shifter control unit 3 sets the position lower by (Model Bit*15+2) bits, which is the data length of a third candidate group of Flex Bits $PFB0_2$, than the leading position of the group of Flex Bits PFB0 as a third candidate leading position of the group of Normal Data PND1, and provide notification regarding the position as data A2 to the barrel shifter BS2. Similarly, notification regarding fourth to 16th candidate leading positions being shifted one bit each is provided by the shifter control unit 3 as data A3 to A15 to the barrel shifters BS3 to BS15.

At time T2, the barrel shifters BS0 to BS15 refer to the data A0 to A15 inputted from the shifter control unit 3 and input candidate groups of Normal Data $PND1_0$ to $PND1_{15}$ (data B0 to B15 in FIG. 1) to the ND decoding units DC0 to DC15, respectively. The ND decoding units DC0 to DC15 start to perform entropy decoding on the candidate groups of Normal Data $PND1_0$ to $PND1_{15}$ at time T2, respectively.

When decoding of the group of Flex Bits PFB0 by the FB decoding unit DC16 is completed at time T3, the FB decoding unit DC16 provides notification regarding the end position of the group of Flex Bits PFB0 (data C16) to the shifter control unit 3. This allows the shifter control unit 3 to select the correct one among the 16 candidate groups of Normal Data $PND1_0$ to $PND1_{15}$. Referring to FIG. 5, when the data C16 indicating the end position BX of the third candidate group of Flex Bits $PFB0_2$ is provided, for example, the shifter control unit 3 selects the candidate group of Normal Data $PND1_2$ whose leading position is set at the position BY immediately following the end position BX, as the correct group of Normal Data PND1. The shifter control unit 3 provides notification regarding this selection to the selector 4, and the selector 4 selects the ND decoding unit DC2 which performs decoding of the candidate group of Normal Data $PND1_2$. Decoded data D2 of the group of Normal Data PND1 outputted from the ND decoding unit DC2 is inputted to the processing unit 5 via the selector 4. When decoding of the group of Normal Data PND1 is completed at time T4, the ND decoding unit DC2 provides notification regarding the end position of the group of Normal Data PND1 in the data stream DS as data C2 to the shifter control unit 3.

From then on, the same processing as the above is repeated until processing of all blocks is completed. The processing unit 5 performs processing such as sorting and joining of data on the plural sets of decoded data D0 to D15 inputted from the ND decoding units DC0 to DC15 and the plural sets of decoded data D16 inputted from the FB decoding unit DC16, and sends out the decoded data after processing to a subsequent processing circuit (inverse prediction unit).

In the decoding unit 1 according to the first preferred embodiment, the first processing unit includes the plural ND decoding units DC0 to DC15. Decoding of the group of Normal Data PND1 by the plural ND decoding units DC0 to DC15 is performed concurrently with decoding of the group of Flex Bits PFB0 by the FB decoding unit DC16. Thus start of decoding of the group of Normal Data PND1 does not need to be queued until decoding of the group of Flex Bits PFB0 is completed. Consequently, reduction of queue time enables enhanced speed of decoding.

Furthermore, the plural ND decoding units DC0 to DC15 stepwise varies the start positions of decoding in the data stream DS for decoding the group of Normal Data PND1. Then the selector 4 selects one ND decoding unit (the ND decoding unit DC2 in the above example) whose start position of decoding is set at the position BY immediately following the end position BX of the group of Flex Bits PFB0, among the plural ND decoding units DC0 to DC15. Thus the decoding unit 1 appropriately deal with variation in the leading position of the group of Normal Data PND1 in the data stream DS due to the variable data length of the group of Flex Bits PFB0. Specifically, decoding is performed on plural possible groups of Normal Data PND1 (candidate groups of Normal Data $PND1_0$ to $PND1_{15}$) with the start positions varying stepwise from each other in advance. Then an appropriate one is selected from the plural candidates, when decoding of the group of Flex Bits PFB0 is completed and the data length is determined. Consequently, correct decoded data of the group of Normal Data PND1 is obtained.

There are 16 possible data lengths of the group of Flex Bits PFB0, depending on the number of data sets of Flex Bits to which a sign bit having one bit is added among 15 sets of Flex Bits. Thus there are also 16 possible leading positions of the group of Normal Data PND1 maximum in the data stream DS. In the decoding unit 1 according to the first preferred embodiment, the first processing unit includes 16 ND decoding units DC0 to DC15. Thus decoding of the group of Normal Data PND1 is performed with all 16 possible leading positions. The decoded data on which decoding is performed with the appropriate start position (coded data D2 in the above example) is therefore included in the 16 sets of decoded data D0 to D15 obtained by the 16 ND decoding units DC0 to DC15 without fail. If such an appropriate decoded data is not included, decoding of the group of Normal Data PND1 needs to be performed again after decoding of the group of Flex Bits PFB0 is completed. Since the decoding unit 1 according to the first preferred embodiment obtains appropriate coded data without fail, there is no possibility that decoding needs to be performed again, and therefore decoding speed is enhanced.

According to the decoding unit 1 of the first preferred embodiment, one macroblock of highpass component of HD Photo includes plural (16) blocks, one block includes plural sets (15 sets) of frequency data, and each set of frequency data includes Normal Data in an upper digit range and Flex Bits in a lower digit range. Thus the present invention is preferably applicable to a decoder for HD Photo. Applying the present invention to a decoder for HD Photo achieves enhanced speed of decoding.

Modification of First Preferred Embodiment

Figure 6:
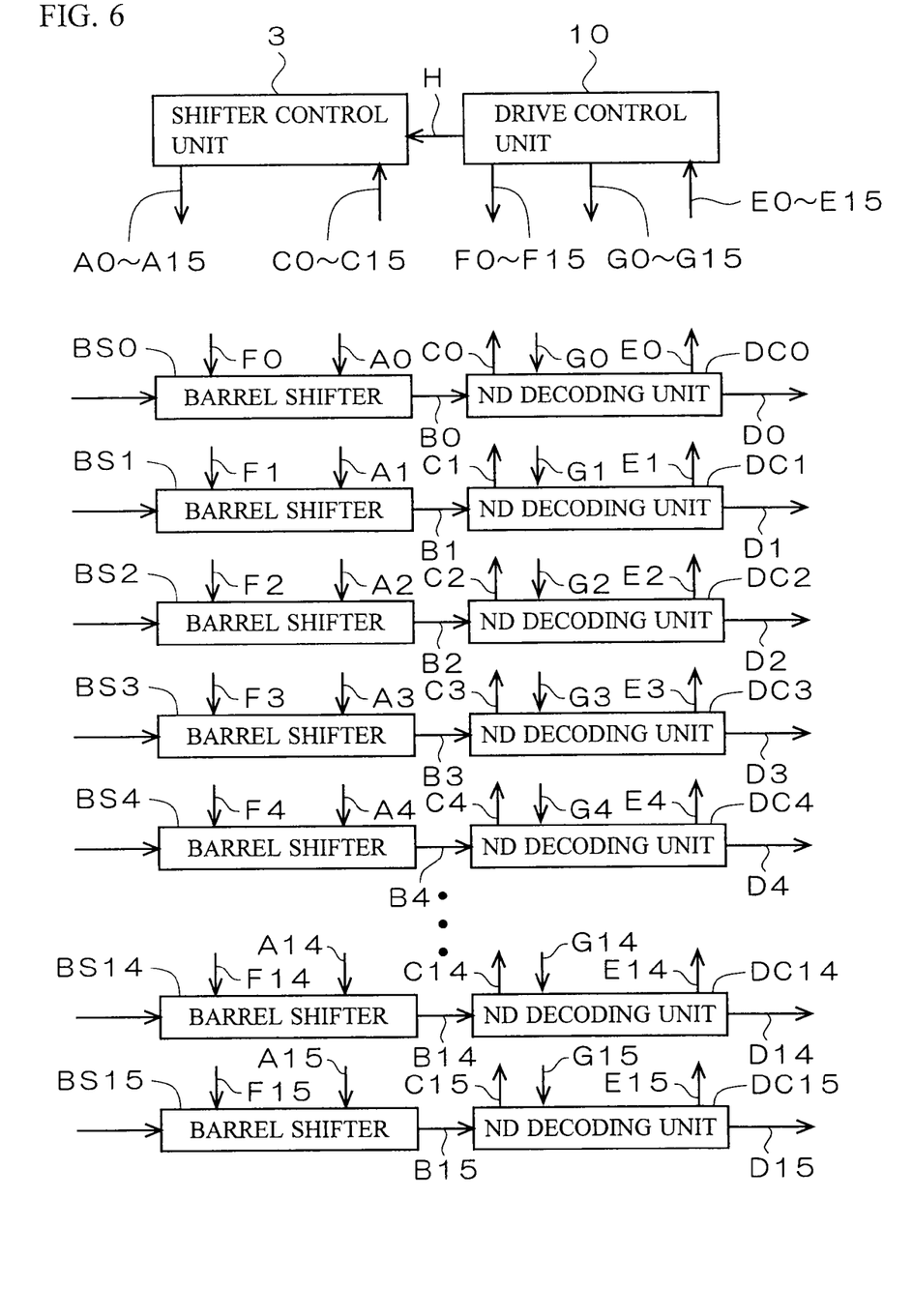
FIG. 6 is a block diagram showing a modification of the image processor according to the first preferred embodiment of the present invention.

FIG. 6 is a block diagram showing a modification of the image processor according to the first preferred embodiment of the present invention. Among the elements composing the decoding unit 1 as shown in FIG. 1, the buffer 2, the selector 4, the barrel shifter BS16, the FB decoding unit DC16, and the processing unit 5 are not shown in FIG. 6. The decoding unit 1 includes a drive control unit 10. The drive control unit 10 is connected to the ND decoding units DC0 to DC15, the barrel shifters BS0 to BS15, and the shifter control unit 3.

As FIG. 4 shows, the barrel shifter BS0 refers to data A0 inputted from the shifter control unit 3 and inputs the group of Normal Data PND0 (data B0 in FIG. 6) to the ND decoding unit DC0 at time T1. The ND decoding unit DC0 performs entropy decoding on the group of Normal Data PND0, so as to output decoded data D0 of the group of Normal Data PND0. At this time, the ND decoding unit DC0 counts the number of data sets having a value that is not zero, among 15 sets of Normal Data (ND0 to ND14) included in the group of Normal Data PND0. Then the ND decoding unit DC0 provides notification regarding the resulting value of count (the value "W") as data E0 to the drive control unit 10.

The drive control unit 10 determines the number of barrel shifters BS (BS0 to BS15) and ND decoding units DC (DC0 to DC15) which are not driven in subsequent decoding of the group of Normal Data PND1, based on the data E0. Specifically, the drive control unit 10 determines that the number equivalent to the value W given by the data E0 is the number of pairs of the barrel shifters BS and the ND decoding units DC which are not driven in decoding the group of Normal Data PND1, among the total of 16 pairs of the barrel shifters BS and the ND decoding units DC.

Decoding of the group of Normal Data PND1 is started at time T2 as shown in FIG. 4. Then the drive control unit 10 inputs control signals F0 to F15 not to drive to as many barrel shifters BS as the number equivalent to the value W from the barrel shifter BS15 in descending order. Similarly, the drive control unit 10 inputs control signals G0 to G15 not to drive to as many ND decoding units DC as the number equivalent to the value W from the ND decoding unit DC15 in descending order. Furthermore, the drive control unit 10 provides notification regarding the value W as data H to the shifter control unit 3. In decoding the group of Normal Data PND1, the shifter control unit 3 does not input the data A0 to A15 to as many barrel shifters BS as the number equivalent to the value W from the barrel shifter BS15 in descending order.

When the value W is "10", for example, 10 barrel shifters BS6 to BS15 and 10 ND decoding units DC6 to DC15 are not driven in decoding the group of Normal Data PND1. The data A6 to A15 are not inputted from the shifter control unit 3 to the 10 barrel shifters BS6 to BS15 that is not driven.

Referring to FIG. 3, in each set of the frequency data FD0 to FD14, if the value of Normal Data is not zero (FD0, FD3, and FD14 in the example of FIG. 3), a sign bit (SB0, SB3, and SB14) is added to the Normal Data. Thus a sign bit is not added to the Flex Bits of the frequency data FD whose Normal Data has a value that is not zero. Candidate data lengths of the group of Flex Bits PFB0 are therefore narrowed down depending on the number of data sets having a value that is not zero among the 15 sets of Normal Data included in the group of Normal Data PND0. The number of candidate groups of Normal Data $PND1_0$ to $PND1_{15}$ is also narrowed down accordingly.

In the decoding unit 1 according to the present modification, superfluous ND decoding units DC (and barrel shifters BS) are not driven, when candidate positions are narrowed down and therefore not all of the 16 ND decoding units DC0 to DC15 (and barrel shifters BS0 to BS15) need to be driven. Thus power consumption is reduced.

Second Preferred Embodiment

Figure 7:
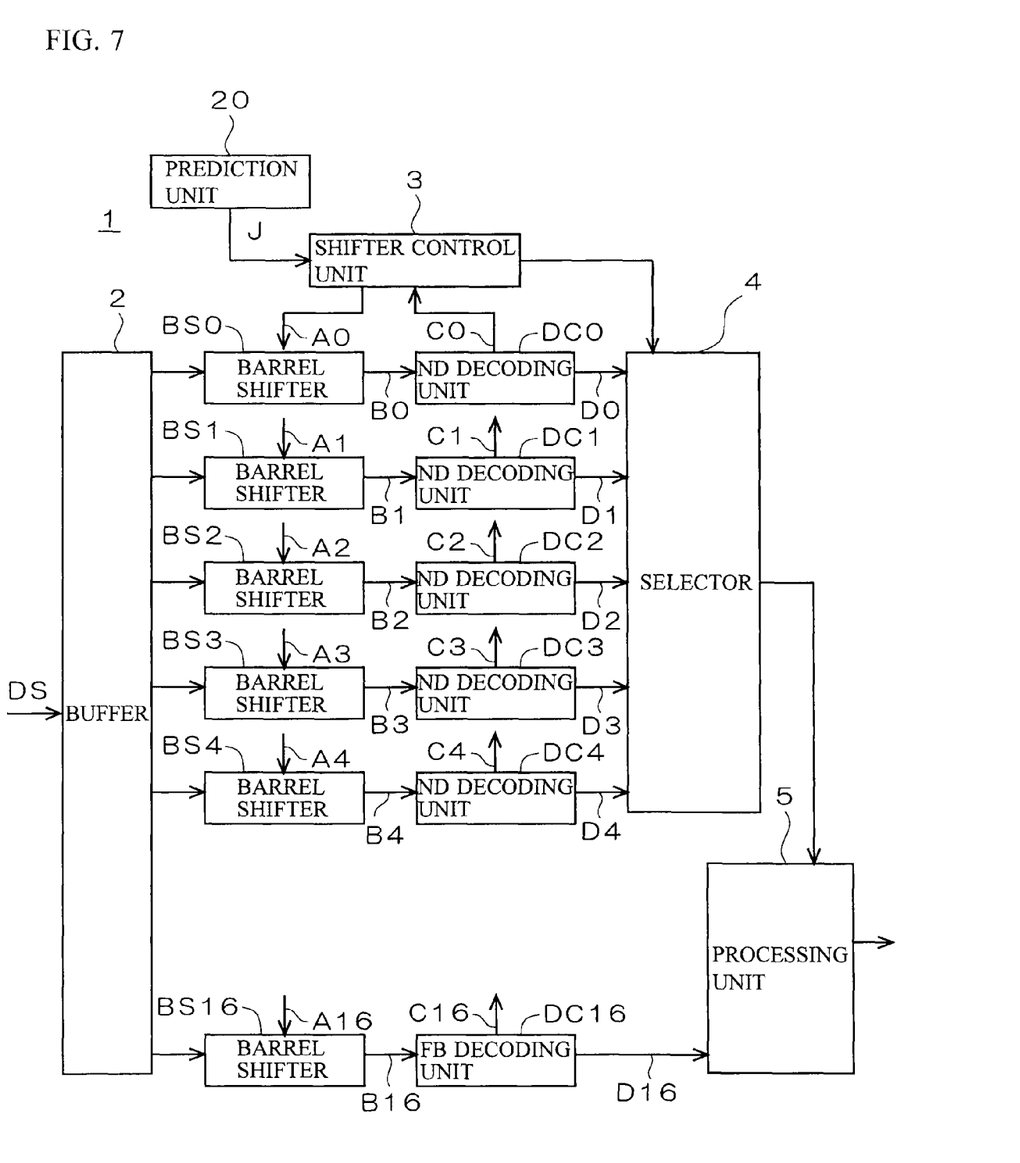
FIG. 7 is a block diagram showing a configuration of an image processor according to a second preferred embodiment of the present invention.

FIG. 7 is a block diagram showing a configuration of an image processor (decoding unit 1) according to a second preferred embodiment of the present invention. Unlike the above first preferred embodiment, the first processing unit includes 5 barrel shifters BS0 to BS4, and 5 ND decoding units DC0 to DC4. The numbers of barrel shifters BS and ND decoding units DC are not limited to 5, but can be any plural number equal to or less than the number of sets of Normal Data (15 sets) included in one block. The decoding unit 1 includes a prediction unit 20. The prediction unit 20 is connected to the shifter control unit 3.

Figure 8A:
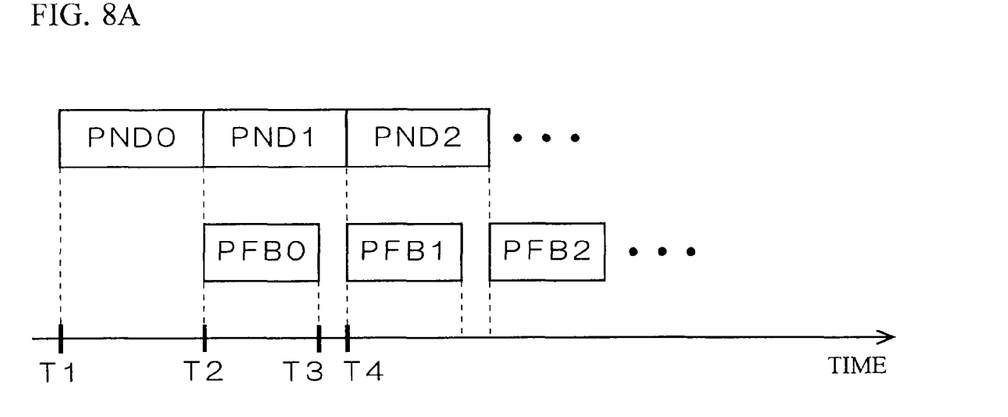
FIGS. 8A and 8B are timing diagrams showing the order in which plural groups of Normal Data and plural groups of Flex Bits are processed by a decoding unit.
Figure 8B:
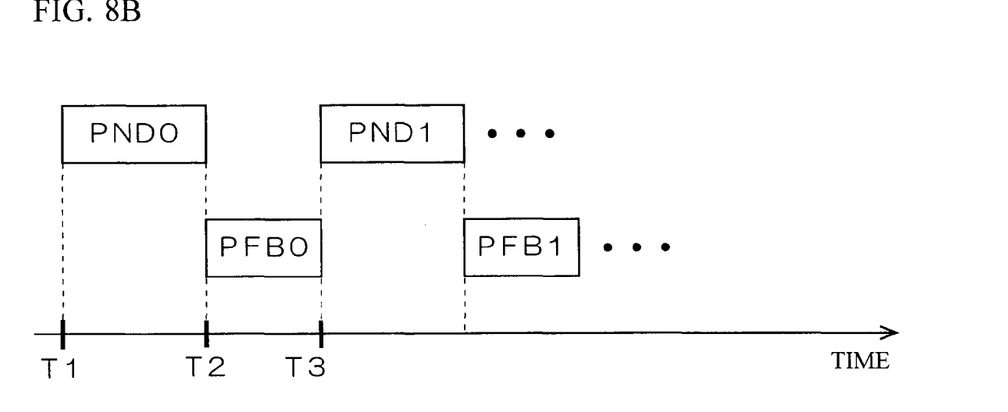

FIGS. 8A and 8B are timing diagrams showing the order in which plural groups of Normal Data and plural groups of Flex Bits are processed by the decoding unit 1. Operation of the decoding unit 1 is illustrated below referring to FIGS. 7 and 8A.

First the barrel shifter BS0 refers to data A0 inputted from the shifter control unit 3 and inputs the group of Normal Data PND0 (data B0 in FIG. 7) to the ND decoding unit DC0 at time T1. The ND decoding unit DC0 performs entropy decoding on the group of Normal Data PND0, so as to output decoded data D0 of the group of Normal Data PND0. The decoded data D0 is inputted to the processing unit 5 via the selector 4. When decoding of the group of Normal Data PND0 is completed, the ND decoding unit DC0 provides notification regarding the end position of the group of Normal Data PND0 in the data stream DS as data C0 to the shifter control unit 3.

Next the barrel shifter BS16 inputs the group of Flex Bits PFB0 (data B16 in FIG. 7) to the FB decoding unit DC16 at time T2. Then the shifter control unit 3 refers to the data C0 inputted from the ND decoding unit DC0, and sets the position immediately following the end position of the group of Normal Data PND0 in the data stream DS as the leading position of the group of Flex Bits PFB0. The shifter control unit 3 then provides notification regarding the leading position of the group of Flex Bits PFB0 as data A16 to the barrel shifter BS16. The FB decoding unit DC16 decodes the group of Flex Bits PFB0, so as to output decoded data D16 of the group of Flex Bits PFB0. The decoded data D16 is inputted to the processing unit 5. When decoding of the group of Flex Bits PFB0 is completed, the FB decoding unit DC16 provides notification regarding the end position of the group of Flex Bits PFB0 in the data stream DS as data C16 to the shifter control unit 3.

Also at time T2, prediction value J of the data length of the group of Flex Bits PFB0 is inputted from the prediction unit 20 to the shifter control unit 3. The prediction unit 20 determines the prediction value J in an arbitrary manner. As a first example, the prediction unit 20 refers to the result of decoding of a block adjacent to the target block, and employs, as the prediction value J, the data length of the group of Flex Bits PFB0 of the reference block that has already been obtained. A block employed in prediction by a prediction unit in a preceding stage of an encoding unit of an encoder may be used as the reference block, for example. As a second example, when processing the chrominance components U and V, the prediction unit 20 employs, as the prediction value J, the data length of the group of Flex Bits PFB0 of the luminance component Y of the identical block that has already been obtained.

The shifter control unit 3 sets the position lower by as many bits as the prediction value J than the leading position of the group of Flex Bits PFB0 in the data stream DS as a first candidate leading position of the group of Normal Data PND1. Then the shifter control unit 3 provides notification regarding the first candidate leading position as data A2 to the barrel shifter BS2.

The shifter control unit 3 also sets the positions upper by two bits and one bit, and the positions lower by one bit and two bits than the first candidate leading position respectively as second, third, fourth, and fifth candidate leading positions. Then the shifter control unit 3 provides notification regarding the second, third, fourth, and fifth candidate leading positions respectively as data A0, A1, A3, and A4 to the barrel shifters BS0, BS1, BS3, and BS4.

At time T2, the barrel shifters BS0 to BS4 refer to the data A0 to A4 inputted from the shifter control unit 3 and input candidate groups of Normal Data (data B0 to B4 in FIG. 7) to the ND decoding units DC0 to DC 4, respectively. The ND decoding units DC0 to DC4 start to perform entropy decoding on the candidate groups of Normal Data at time T2, respectively.

When decoding of the group of Flex Bits PFB0 by the FB decoding unit DC16 is completed at time T3, the FB decoding unit DC16 provides notification regarding the end position of the group of Flex Bits PFB0 (data C16) to the shifter control unit 3. This allows the shifter control unit 3 to select the correct one among the five candidate groups of Normal Data. The shifter control unit 3 provides notification regarding this selection to the selector 4, and the selector 4 selects one ND decoding unit DC (it is assumed that ND decoding unit DC1 is selected in this example) which performs decoding of the correct candidate group of Normal Data. Decoded data D1 of the group of Normal Data PND1 outputted from the ND decoding unit DC1 is inputted to the processing unit 5 via the selector 4. When decoding of the group of Normal Data PND1 is completed at time T4, the ND decoding unit DC1 provides notification regarding the end position of the group of Normal Data PND1 in the data stream DS as data C1 to the shifter control unit 3.

In contrast, referring to FIG. 8B, when the correct one is not included in the five candidate groups of Normal Data, decoding of the candidate groups of Normal Data by the ND decoding units DC0 to DC4 is aborted at time T3. The shifter control unit 3 refers to the data C16 inputted from the FB decoding unit DC16, and sets the position immediately following the end position of the group of Flex Bits PFB0 in the data stream DS as the leading position of the group of Normal Data PND1. The shifter control unit 3 then provides notification regarding the leading position of the group of Normal Data PND1 as data A0 to the barrel shifter BS0, or alternatively, to any one of the other barrel shifters BS1 to BS4.

The barrel shifter BS0 inputs the group of Normal Data PND1 to the ND decoding unit DC0 at time T3. The ND decoding unit DC0 decodes the group of Normal Data PND1, so as to output decoded data D0. The decoded data D0 is inputted to the processing unit 5 via the selector 4. When decoding of the group of Normal Data PND1 is completed, the ND decoding unit DC0 provides notification regarding the end position of the group of Normal Data PND1 in the data stream DS as data C0 to the shifter control unit 3.

In the decoding unit 1 of the second preferred embodiment, there are 16 possible data lengths of the group of Flex Bits PFB0, depending on the number of data sets of Flex Bits to which a sign bit having one bit is added among 15 sets of Flex Bits. Thus there are also 16 possible leading positions of the group of Normal Data PND1 maximum in the data stream DS. In the decoding unit 1 according to the second preferred embodiment, the first processing unit includes smaller number (five in the above example) of ND decoding units DC0 to DC4, rather than 16. Thus the circuit size is reduced, compared to the case where 16 ND decoding units DC0 to DC15 are provided.

In the decoding unit 1 of the second preferred embodiment, it is possible that the decoded data on which decoding is performed with the appropriate start position is not included in the five sets of decoded data D0 to D4 obtained by the five ND decoding units DC0 to DC4. In such a case, however, decoding on the group of Normal Data PND1 is performed again after decoding on the group of Flex Bits PFB0 is completed and the end position is determined, with a start position being set at the position immediately following the end position, as shown in FIG. 8B. Correct decoded data is thus obtained.

Modification of Second Preferred Embodiment

Figure 9:
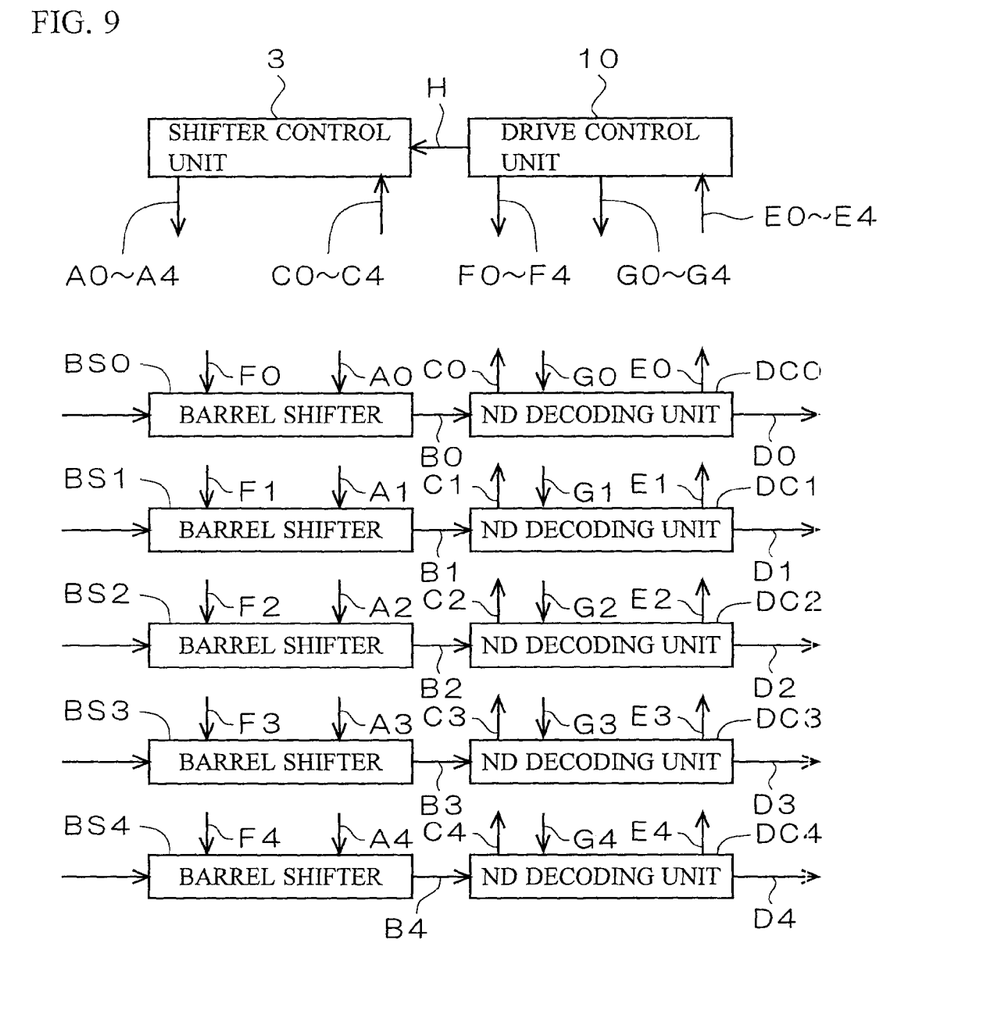
FIG. 9 is a block diagram showing a modification of an image processor according to a second preferred embodiment of the present invention.

FIG. 9 is a block diagram showing a modification of an image processor according to the second preferred embodiment of the present invention. Among the elements composing the decoding unit 1 as shown in FIG. 7, the buffer 2, the selector 4, the barrel shifter BS16, the FB decoding unit DC16, the prediction unit 20, and the processing unit 5 are not shown in FIG. 9. The decoding unit 1 includes a drive control unit 10. The drive control unit 10 is connected to the ND decoding units DC0 to DC4, barrel shifters BS0 to BS4 and the shifter control unit 3.

As FIG. 8A shows, the barrel shifter BS0 refers to data A0 inputted from the shifter control unit 3 and inputs the group of Normal Data PND0 (data B0 in FIG. 9) to the ND decoding unit DC0 at time T1. The ND decoding unit DC0 performs entropy decoding on the group of Normal Data PND0, so as to output decoded data D0 of the group of Normal Data PND0. At this time, the ND decoding unit DC0 counts the number of data sets having a value that is not zero, among 15 sets of Normal Data (ND0 to ND14) included in the group of Normal Data PND0. Then the ND decoding unit DC0 provides notification regarding the resulting value of count (the value "W") as data E0 to the drive control unit 10.

The drive control unit 10 determines the number of barrel shifters BS (BS0 to BS4) and ND decoding units DC (DC0 to DC4) which are not driven in subsequent decoding of the group of Normal Data PND1, based on the data E0. Specifically, the drive control unit 10 subtracts the number equivalent to the value W given by the data E0 from "16", which is the maximum number of possible data lengths of the group of Flex Bits PFB0. When the value obtained as the result of subtraction (the value "P") is smaller than "5", which is the number of pairs of the barrel shifters BS and the ND decoding units DC, it is determined that the difference value between "5" and "P" (the value "Q") is the number of pairs of the barrel shifters BS and the ND decoding units DC which are not driven in decoding the group of Normal Data PND1.

Decoding of the group of Normal Data PND1 is started at time T2 as shown in FIG. 8A. Then the drive control unit 10 inputs control signals F0 to F4 not to drive to as many barrel shifters BS as the number equivalent to the value Q from the barrel shifter BS4 in descending order. Similarly, the drive control unit 10 inputs control signals G0 to G4 not to drive to as many ND decoding units DC as the number equivalent to the value Q from the ND decoding unit DC4 in descending order. Furthermore, the drive control unit 10 provides notification regarding the value Q as data H to the shifter control unit 3. In decoding the group of Normal Data PND1, the shifter control unit 3 does not input the data A0 to A4 to as many barrel shifters BS as the number equivalent to the value Q from the barrel shifter BS4 in descending order.

When the value W is "13", for example, the value P is "3" (=16−13), and the value Q is "2" (=5−3). In such a case, two barrel shifters BS3 and BS4 and two ND decoding units DC3 and DC4 are not driven in decoding the group of Normal Data PND1. The data A3 and A4 are not inputted from the shifter control unit 3 to the two barrel shifters BS3 and BS4 that are not driven.

In the decoding unit 1 according to the present modification, superfluous ND decoding units DC (and barrel shifters BS) are not driven, when candidate positions are narrowed down and therefore not all of the five ND decoding units DC0 to DC4 (and barrel shifters BS0 to BS4) need to be driven. Thus power consumption is reduced.

Examples of applying the present invention to highpass component in HD Photo are described above. The present invention, however, is also applicable to lowpass component in HD Photo. In HD Photo, one macroblock of lowpass component includes one block for each of the YUV components. That is, one macroblock includes plural blocks. Furthermore, one block includes plural sets (15 sets) of frequency data, and each set of the frequency data includes Normal Data in an upper digit range and Flex Bits in a lower digit range. Thus the present invention is applicable to lowpass component in HD Photo, and the same effects as the above are achieved.

While the invention has been described in detail, the foregoing description is in all aspects illustrative and not restrictive. It is understood that numerous other modifications and variations can be devised without departing from the scope of the invention.

What is claimed is:

1. An image processor decoding plural sets of data included in plural blocks,
   each of the blocks including plural sets of data,
   each set of the data including upper data in an upper digit range and lower data in a lower digit range,
   the image processor receiving data stream including a group of upper data of a first block, a group of lower data of the first block and a group of upper data of a second block aligned in this order,
   the image processor comprising:
   a first processing unit including a plurality of decoding units and decoding a group of upper data;
   a second processing unit decoding a group of lower data; and
   a selecting unit selecting one of the plurality of decoding units, wherein
   the plurality of decoding units perform decoding of the group of upper data of the second block, stepwise varying a start position of decoding in the data stream, concurrently with decoding of the group of lower data of the first block by the second processing unit, and
   the selecting unit selects, from the plurality of decoding units, one decoding unit with a start position of decoding being set at a position immediately following an end position of the group of lower data of the first block, based on a result of decoding of the group of lower data of the first block by the second processing unit.

2. The processing unit according to claim 1, wherein
   each of the blocks includes N sets of the data, where N represents a natural number not less than 2, and
   the first processing unit includes N+1 decoding units (the number of the decoding units included in the first processing unit is N+1).

3. The image processor according to claim 2, further comprising:
   a third processing unit obtaining a candidate leading position of the group of upper data of the second block in the data stream, based on a result of decoding of the group of upper data of the first block, wherein
   only as many decoding units as the number of the candidate leading positions among the N+1 decoding units perform decoding of the group of upper data of the second block.

4. The image processor according to claim 3, wherein
   the data is frequency data of highpass or lowpass component in HD Photo.

5. The image processor according to claim 2, wherein
   the data is frequency data of highpass or lowpass component in HD Photo.

6. The image processor according to claim 1, wherein
   each of the block includes N sets of data, where N represents a natural number not less than 2,
   the first processing unit includes M decoding units, where M represents a natural number not less than 2 and not more than N, and
   when a decoding unit with a start position of decoding being set at a position immediately following the end position is not included in the M decoding units, any one of the M decoding units performs decoding of the group of upper data of the second block with a position immediately following the end position as a start position.

7. The image processor according to claim 6, further comprising:
   a third processing unit obtaining a candidate leading position of the group of upper data of the second block in the data stream, based on a result of decoding of the group of upper data of the first block, wherein
   when the number of the candidate leading positions is less than M, only as many decoding units as the number of the candidate leading positions among the M decoding units perform decoding of the group of upper data of the second block.

8. The image processor according to claim 7, wherein
   the data is frequency data of highpass or lowpass component in HD Photo.

9. The image processor according to claim 6, wherein
   the data is frequency data of highpass or lowpass component in HD Photo.

10. The image processor according to claim 1, wherein
    the data is frequency data of highpass or lowpass component in HD Photo.

* * * * *